(12) United States Patent
Feger et al.

(10) Patent No.: US 7,196,899 B1
(45) Date of Patent: Mar. 27, 2007

(54) CAPACITOR ANODE ASSEMBLY

(75) Inventors: Christopher R. Feger, Easley, SC (US); Thomas F. Strange, Easley, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 233 days.

(21) Appl. No.: 11/031,300

(22) Filed: Jan. 7, 2005

(51) Int. Cl.
*H01G 9/02* (2006.01)

(52) U.S. Cl. .................. 361/512; 361/509; 361/522; 361/528; 29/25.03

(58) Field of Classification Search ........ 361/508–509, 361/511–512, 516, 522, 517–519, 535–537, 361/301.3, 301.4; 29/25.03; 607/5–8, 36–38
See application file for complete search history.

(56) References Cited

U.S. PATENT DOCUMENTS

| | | | |
|---|---|---|---|
| 4,518,471 A | 5/1985 | Arora | 204/129.1 |
| 4,525,249 A | 6/1985 | Arora | 204/129.75 |
| 5,131,388 A * | 7/1992 | Pless et al. | 607/5 |
| 5,370,663 A | 12/1994 | Lin | 607/5 |
| 5,496,481 A | 3/1996 | Liu | 252/62.2 |
| 5,507,966 A | 4/1996 | Liu | 252/62.2 |
| 5,522,851 A | 6/1996 | Fayram | 607/5 |
| 5,687,057 A | 11/1997 | Dapo | 361/506 |
| 5,715,133 A * | 2/1998 | Harrington et al. | 361/500 |
| 5,822,177 A | 10/1998 | Popp et al. | 361/508 |
| 5,930,109 A * | 7/1999 | Fishler | 361/508 |
| 6,006,133 A | 12/1999 | Lessar et al. | 607/5 |
| 6,110,233 A | 8/2000 | O'Phelan et al. | 29/25.03 |
| 6,249,423 B1 | 6/2001 | O'Phelan et al. | 361/502 |
| 6,493,212 B1 * | 12/2002 | Clarke et al. | 361/521 |
| 6,527,955 B1 | 3/2003 | Sun | 210/555.22 |
| 6,587,329 B1 | 7/2003 | Feger | 361/504 |
| 6,680,841 B2 * | 1/2004 | Tadanobu et al. | 361/523 |
| 6,799,072 B2 * | 9/2004 | Ries et al. | 607/36 |
| 6,819,544 B1 | 11/2004 | Nielsen et al. | 361/508 |
| 6,881,232 B2 | 4/2005 | O'Phelan et al. | 29/25.03 |
| 2002/0034062 A1 | 3/2002 | O'Phelan et al. | 361/511 |
| 2004/0105212 A1 | 6/2004 | O'Phelan et al. | 361/302 |
| 2004/0120099 A1 | 6/2004 | Elliott et al. | 361/301.5 |
| 2005/0117277 A1 | 6/2005 | Norton et al. | 361/512 |

FOREIGN PATENT DOCUMENTS

| | | |
|---|---|---|
| EP | 1 296 389 A1 | 9/2002 |
| JP | 6-208849 | 7/1994 |
| WO | WO 99/54896 | 10/1999 |
| WO | WO 99/59174 | 11/1999 |
| WO | WO 00/79550 A1 | 12/2000 |

OTHER PUBLICATIONS

Ennis, et al., "The High Voltage Capacitor", Cardioverter Defibrillator Therapy: The Engineering—Clinical Interface, M.W. Kroll and M.H. Lehmann, eds., Kluwer Academic Publishers, Norwell, Mass., pp. 223-239 (1996).

* cited by examiner

*Primary Examiner*—Nguyen T. Ha
(74) *Attorney, Agent, or Firm*—Steven M. Mitchell

(57) ABSTRACT

According the present invention, anode foils are encapsulated in separator material so as to insulate them from the metal housing of an electrolytic capacitor. The present invention also provides for enclosed capacitor configurations for use in stacked capacitor configurations. Preferably, heat-sealable polymeric materials are used as separator materials to encapsulate or enclose the anode assemblies and capacitor configurations. The encapsulated anode assemblies and capacitor configurations of the present invention may be used in implantable cardioverter defibrillators.

21 Claims, 5 Drawing Sheets

CAPACITOR ANODE ASSEMBLY

BACKGROUND OF THE INVENTION

1. Field of the Invention

The present invention relates to electrolytic capacitors and, more particularly, to the use of separator material to encapsulate anode assemblies or to encapsulate stacked capacitor configurations for use with electrolytic capacitors. The present invention also relates to electrolytic capacitors comprising the anode assemblies or stacked capacitor configurations of the present invention.

2. Related Art

Compact, high voltage capacitors are utilized as energy storage reservoirs in many applications, including implantable medical devices. These capacitors are required to have a high energy density since it is desirable to minimize the overall size of the implanted device. This is particularly true of an Implantable Cardioverter Defibrillator (ICD), also referred to as an implantable defibrillator, since the high voltage capacitors used to deliver the defibrillation pulse can occupy as much as one third of the ICD volume.

Implantable Cardioverter Defibrillators, such as those disclosed in U.S. Pat. No. 5,131,388, incorporated herein by reference, typically use two electrolytic capacitors in series to achieve the desired high voltage for shock delivery. For example, an implantable cardioverter defibrillator may utilize two 350 to 400 volt electrolytic capacitors in series to achieve a voltage of 700 to 800 volts.

Electrolytic capacitors are used in ICDs because they have the most nearly ideal properties in terms of size, reliability and ability to withstand relatively high voltage. Conventionally, such electrolytic capacitors typically consist of a cathode electrode, an electrically conductive electrolyte and a porous anode with a dielectric oxide film formed thereon. While aluminum is the preferred metal for the anode plates, other metals such as tantalum, magnesium, titanium, niobium, zirconium and zinc may be used. A typical electrolyte may be a mixture of a weak acid and a salt of a weak acid, preferably a salt of the weak acid employed, in a polyhydroxy alcohol solvent. The electrolytic or ion-producing component of the electrolyte is the salt that is dissolved in the solvent. The entire laminate is rolled up into the form of a substantially cylindrical body, or wound roll, that is held together with adhesive tape and is encased, with the aid of suitable insulation, in an aluminum tube or canister. Connections to the anode and the cathode are made via tabs. Alternative flat constructions for aluminum electrolytic capacitors are also known, comprising a planar, layered, stack structure of electrode materials with separators interposed therebetween, such as those disclosed in the above-mentioned U.S. Pat. No. 5,131,388.

The need for high voltage, high energy density capacitors is most pronounced when employed in implantable cardiac defibrillators (ICDs). In ICDs, as in other applications where space is a critical design element, it is desirable to use capacitors with the greatest possible capacitance per unit volume. Since the capacitance of an electrolytic capacitor is provided by the anodes, a clear strategy for increasing the energy density in the capacitor is to minimize the volume taken up by paper and cathode and maximize the number and volume of the anodes. A multiple anode flat, stacked capacitor configuration requires fewer cathodes and paper spacers than a single anode configuration and thus reduces the size of the device. A multiple anode stack consists of a number of units consisting of a cathode, a paper spacer, two or more anodes, a paper spacer and a cathode, with neighboring units sharing the cathode between them. In order to achieve higher energy densities, three, four and five anodes can be stacked per layer. Maximization of the anode volume has also been accomplished by etching to achieve more effective anode surface area, and making the relative size of the anode plates larger with respect to the cathode plates.

Increasing the size of the anodes creates another problem, however, as it is still necessary to electrically insulate the anode plates from the case, which typically is grounded to the cathode assembly. Insulation between the anodes and the case can be accomplished using an insulating tape such as KAPTON® or TEFLON® (both available from DuPont). Taping is generally best performed with an adhesive applied, so as to hold the stack together during the assembly process, securing the tape to prevent interference with welding, and providing positive evidence of insulation between case and anode edge, without gaps to compromise the desirable insulating properties.

This solution has proven to be problematic though, as the adhesive tape can interfere with the aging process of the anode edges. Aging is performed to assure that there is sufficient dielectric present on raw metal portions of the anode to allow for adequate charge storage with low leakage and short charge times to voltage. However, adhesive covering the edge of the anodes can prevent fill electrolyte (the aging medium) from reaching the raw aluminum surfaces, resulting in areas of the anodes that have insufficient dielectric voltage during fast charging and discharging. If the adhesive partially or completely dissolves into the electrolyte, these surfaces become exposed to fresh electrolyte. In ICDs used for pulse discharge applications, during the charging process, this can result in abnormally long charge times, due to the fact that charging energy is consumed to age these newly exposed areas in order to sufficiently store charge. This effect is particularly pronounced when the battery open circuit voltage drops due to a change in battery chemistry at mid-life.

Some methods to alleviate this problem include: application of a layer of spacer in between the tape and anode edge; using tape with no, minimal, or patterned adhesive; and withdrawing the anodes to inside the cathode layers and thereby preventing adhesive from contacting the edges. These solutions all present drawbacks either to manufacturability, or result in a decrease in energy density due to decreased anode volume. As a result, there is a need to provide an electrolytic capacitor with a large anode volume to produce a high energy density, while still maintaining greater total manufacturability.

SUMMARY OF THE INVENTION

The present invention provides for encapsulation of anode assemblies and encapsulation or enclosure of stacked capacitor configurations for use within an electrolytic capacitor. The present invention also provides for electrolytic capacitors including the encapsulated anode assemblies and encapsulated or enclosed stacked capacitor configurations of the present invention.

In one embodiment, the present invention provides for an anode assembly comprising at least one flat anode foil encapsulated in a separator material. In suitable such embodiments, a plurality of anodes may be stacked on top of each other and then encapsulated. Preferably, 2, 3, 4, 5, 6, 7, or 8 anode foils are stacked on top of each other and then encapsulated. Encapsulating the anode foils according to the present invention provides for an anode assembly that when placed in a electrolytic capacitor, remains insulated from surrounding cathodes as well as the metal housing encasing the capacitor. Suitable separator materials for use throughout the present invention include polymeric materials and paper. Preferably, such materials will be heat-sealable. In suitable such embodiments, heat-sealable polymeric materials useful in the present invention include, but are not limited to, polypropylene, polyethylene and polypropylene-polyethylene copolymers. Preferably, the separator material for use in the present invention is permeable to ions.

Anodes for use throughout the present invention preferably comprise high surface area, formed aluminum foil. In suitable such embodiments, the anodes of the present invention may be etched.

The present invention also encompasses electrolytic capacitors comprising the anode assemblies of the present invention. In one such embodiment, the present invention provides for electrolytic capacitors which comprise a plurality of stacked units consisting of a cathode, one or more encapsulated anode assemblies, and a second cathode, with neighboring stacked units sharing the cathode between them. The electrolytic capacitors of the present invention may be used in implantable cardiac defibrillators (ICD).

The anode assemblies of the present invention may be encapsulated in a single piece of separator material, or in a plurality of pieces of separator material. Suitably, the separator material is heat-sealed around the anode assemblies using a hot-knife or laser. In other embodiments, the separator material may be dye-cut around the anode assemblies. Preferably, the anodes and separator material utilized throughout the present invention also comprise alignment holes which aid in assembly of the stacked capacitor configuration.

The anode assemblies of the present invention may be impregnated with an ethylene glycol based electrolyte. Suitably, this electrolyte may comprise ammonium azelate and boric acid in ethylene glycol, or ammonium borate and ammonium phosphate in ethylene glycol. In other embodiments, this electrolyte may further comprise a cathode depolarizer.

The present invention also provides for processes for preparing the encapsulated anode assemblies of the present invention. Such processes comprise (a) producing an anode foil assembly by encapsulating at least one anode foil in a separator material; and (b) bringing the anode foil assembly in contact with at least one cathode, wherein the separator material prevents the anode foil from contacting at least one cathode. Preferably, 2, 3, 4, 5, 6, 7, or 8 anode foils are stacked on top of each other and then encapsulated. As noted above, preferably the encapsulation step comprises encapsulating an anode foil in a heat-sealable polymeric material. Suitably, this heat-sealing is performed with a hot-knife or a laser.

In additional embodiments, the present invention provides for processes for preparing electrolytic capacitors comprising the encapsulated anode assemblies of the present invention. In suitable such embodiments, the electrolytic capacitor may be prepared by rolling together the encapsulated anode foil assembly and at least one cathode. Preferably, an electrolytic capacitor of the present invention may be prepared by creating a plurality of stacked units consisting of a cathode, one or more encapsulated anode assemblies, and a second cathode, with neighboring stacked units sharing the cathode between them. Preferably, this capacitor is placed in an electrolytic capacitor housing, whereby the separator material encapsulating the anode assembly provides insulation between the anodes and the capacitor housing. In suitable such embodiments, the electrolytic capacitors of the present invention are part of an implantable cardiac defibrillator (ICD). As noted above, the electrolytic capacitors produced using the present invention may also comprise an electrolyte solution.

The present invention also provides for multiple anode flat, stacked capacitor configurations comprising at least one stacked unit consisting of a cathode, a spacer, one or more anodes, a spacer, and a second cathode, wherein this capacitor configuration is then enclosed in a separator material. Preferably the stacked capacitor configurations of the present invention will comprise a plurality of stacked units, each stacked unit comprising 2, 3, 4, 5, 6, 7 or 8 anodes stacked on top of each other.

The separator materials for use in this embodiment of the invention may also be polymeric or paper. Preferably, such materials will be heat-sealable. In suitable such embodiments, heat-sealable polymeric materials useful in this embodiment of the present invention include, but are not limited to, polypropylene, polyethylene and polypropylene-polyethylene copolymers. Preferably, the separator material for use in the present invention is permeable to ions.

Preferably, the separator material for use in this embodiment of the present invention is heat-sealed around a capacitor configuration using a hot-knife or laser. The separator material may comprise a single sheet, or a plurality of sheets, to encapsulate the capacitor configurations of the present invention. Spacer materials for use in the present invention include, but are not limited to, polymeric materials and paper.

The encapsulated capacitor configuration of the present invention may then be incorporated in an electrolytic capacitor, which may be in turn be part of an ICD. Encapsulating the capacitor configuration in separator material separates the configuration from the capacitor housing, thereby insulating the anodes of the configuration from the metal case. The configuration may be impregnated with ethylene glycol based electrolytes as noted above.

In other suitable such embodiments, the capacitor configurations of the present invention may be enclosed in separator material. In certain such embodiments, the capacitor configurations of the present invention may be wrapped with separator material so as to cover the edges of the configuration, but not covering the top and bottom of the configuration.

The present invention also provides for processes for preparing a multiple anode flat, stacked capacitor configuration comprising: (a) stacking one or more units consisting of a cathode, a spacer, one or more anodes, a spacer, and a second cathode; and (b) enclosing the configuration in a separator material. Suitable separator, spacer and anode materials for use in this embodiment of the invention are described throughout the present specification. As noted above, these capacitor configurations may be used in an electrolytic capacitor that forms part of an ICD. Preferably, the capacitor configurations of the present invention are enclosed by heat-sealing a separator material around the configuration. Suitably, the capacitor configurations may be fully encapsulated in a separator material, or in other such embodiments, the configurations may be wrapped around the edges with separator material so as not to cover the top and/or bottom of the configuration.

BRIEF DESCRIPTION OF THE DRAWINGS/FIGURES

DETAILED DESCRIPTION OF THE INVENTION

Figure 1:
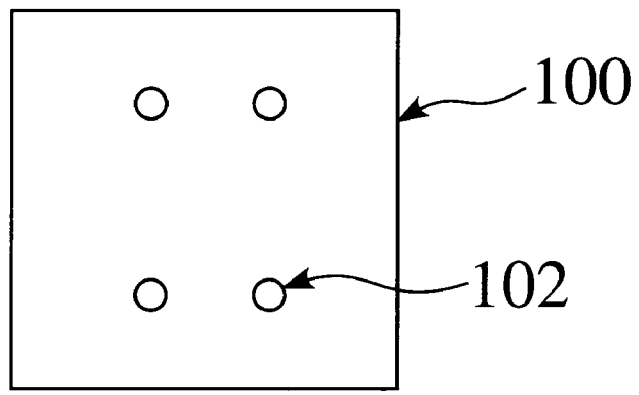
FIG. 1 shows a single sheet of separator material for use according to one embodiment of the present invention.

The present invention provides for encapsulated anode assemblies and encapsulated or enclosed stacked capacitor configurations for use within an electrolytic capacitor. The present invention also provides electrolytic capacitors including the encapsulated anode assemblies and encapsulated or enclosed stacked capacitor configurations of the present invention.

Preferred embodiments of the present invention are now described. While specific configurations and arrangements are discussed, it should be understood that this is done for illustrative purposes only. A person skilled in the relevant art will recognize that other configurations and arrangements can be used without departing from the spirit and scope of the invention. It will also be apparent to a person skilled in the relevant art that this invention can be employed in a variety of other devices and applications.

The capacitance value of a capacitor (C) depends on the area (A) of the plates on which the charge accumulates, the space (s) created by the insulator between the plates, and the dielectric constant or relative permittivity (k) of the insulating material according to the equation:

$$C = \varepsilon \cdot k \frac{A}{s}.$$

where $\varepsilon$ is the permittivity of free space (8.854·10−14 F/cm). *Implantable Cardioverter Defibrillator Therapy: The Engineering-Clinical Interface*, M. W. Kroll and M. H. Lehmann, eds., Kluwer Academic Publishers, Norwell, Mass., pp. 223–239 (1996). One way to maximize the capacitance and energy density of a capacitor is to make the surface area of the anodes as large as possible. This has been accomplished in several ways, including etching the surface of the foil anodes to generate more effective anode surface area, and stacking multiple anodes between spacer/cathode assemblies. A larger surface area can also be generated simply by making anodes that are larger with respect to the cathode plates of the assembly. In a stacked capacitor configuration, this creates an additional problem, however, as the anode plates must be electrically insulated from the surrounding metallic case or housing which is typically grounded to the cathode assembly. Alternatively, the case is made as small as possible without leaving much room between the anode edges and the case.

Insulation, typically in the form of tape wrapped around the edges of the anodes has been used to provide separation between the case and anode edge. This tape, however, can interfere with the aging process of the edges, generating areas of the anode that have insufficient dielectric voltage during fast charging and discharging. This can result in abnormally long charge times, due to the fact that charging energy is consumed to age these areas in order to sufficiently store charge. The present invention provides for encapsulated anode assemblies and encapsulated or enclosed stacked capacitor configurations which allow for a maximized anode surface area, while still maintaining the required insulation between the anodes and the capacitor housing.

Figure 3:
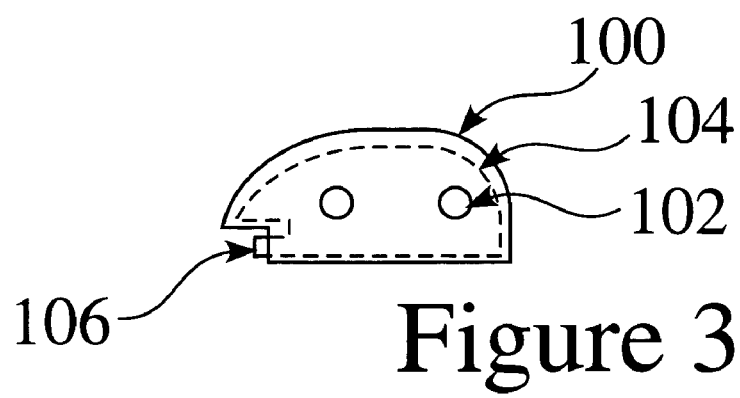
FIG. 3 shows a flat anode encapsulated in the single sheet of separator material if FIG. 1 following heat-sealing according to the present invention.

In one embodiment, the present invention provides for an anode assembly comprising at least one anode foil encapsulated in a separator material. The diagram in FIG. 3 depicts an anode foil 104 encapsulated in a separator material 100. In one embodiment of the present invention, at least one anode foil 104 is encapsulated in one continuous piece of separator material 100. FIG. 1 depicts a single, continuous piece of separator material that is used to encapsulate anode foil 104. Both the anode foil 104, and the separator material 100, may contain one or more alignment holes 102 to aid in the assembly of a capacitor configuration. A post or other alignment device is placed through the alignment holes 102 such that when the anode foils 104 and the separator material 100 are stacked on top of each other, the proper alignment of the anode tabs 106 is maintained. Alignment holes are necessary to obtain the tightest possible tolerances between anodes and cathodes with respect to each other and the case. These features are used so that the proper spacing by the separator is maintained between the anode and the cathode, preventing a catastrophic event such as a direct arc between the aforementioned electrodes. As the case is grounded to the cathode, there must be proper insulation between protruding anodes as well. Using these features to accurately align the anode can allow a maximum amount of area to be utilized, which results in the best optimization of energy density in this embodiment. The present invention also encompasses the use of a plurality of anodes. In a suitable embodiment, a plurality of anodes may be stacked on top of each other prior to being encapsulated in separator material. Preferably, 2, 3, 4, 5, 6, 7, or 8 anode foils are stacked on top of each other prior to encapsulation.

Figure 2:
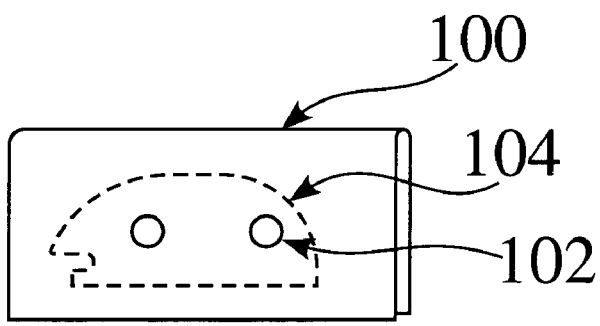
FIG. 2 shows a flat anode covered in the single sheet of separator material of FIG. 1 prior to heat-sealing.

In certain such embodiments, a single piece of separator material 100 is placed into a stacking fixture, and one or more anode foils 104 are subsequently placed on top of the separator material in a stacked configuration. The single piece of separator material is then folded over the one or more anodes to completely cover them as shown in FIG. 2. The separator material can then be cut and heat-sealed in one step around the anode(s) to create the encapsulated assembly shown in FIG. 3. Preferably, both the anode foils and the separator material comprise one or more alignment holes 102 so that the anodes and separator material can be properly aligned and assembled. The encapsulated assembly may also comprise cutouts for the anode tabs 106 to allow for welding to other anodes.

Figure 4:
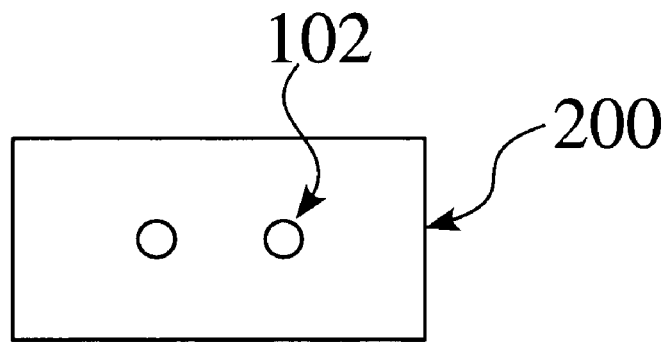
FIG. 4 shows a sheet of separator material for use according to a second embodiment of the present invention.
Figure 5:
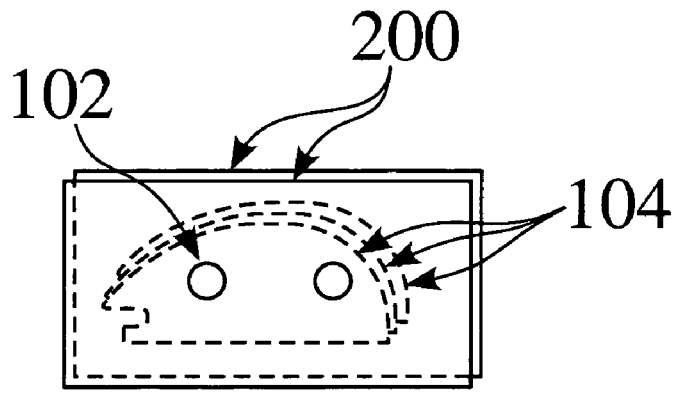
FIG. 5 shows multiple flat stacked anodes covered in two separate sheets of separator material of FIG. 4 prior to heat-sealing.

In another embodiment of the present invention, at least one anode foil may be encapsulated in a plurality of separator material pieces. FIG. 4 depicts a single piece of separator material 200, a plurality of which may be used encapsulate at least one anode foil 104. In one embodiment, two pieces of separator material 200 may be used to encapsulate one or more anode foils 104 as depicted in FIG. 5. FIG. 5 shows a plurality of stacked anodes encapsulated within two pieces of separator material according to the present invention.

Figure 6:
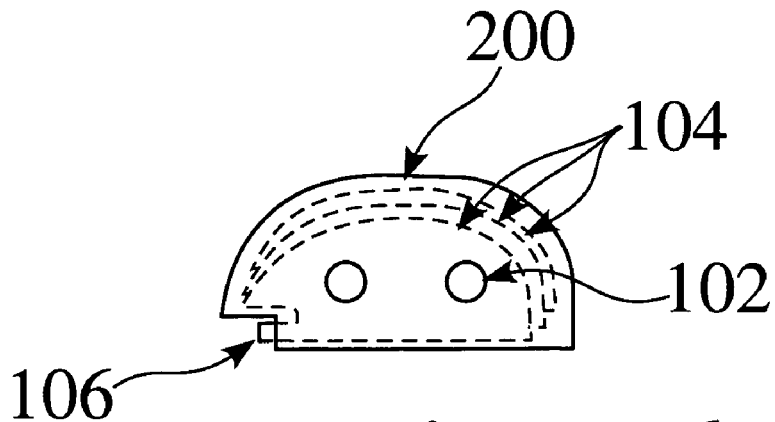
FIG. 6 shows multiple flat stacked anodes encapsulated in the separator material of FIG. 4 following heat-sealing.

In certain such embodiments, one piece of separator material 200 is placed into a stacking fixture, and subsequently 2, 3, 4, 5, 6, 7, or 8 anode foils 104 are placed on top of the first separator sheet in a stacked configuration. A second piece of separator material 200 is then placed on top of the stack of anodes. The separator sheets can then be cut and heat-sealed around the anodes in one step to create the encapsulated assembly shown in FIG. 6. Preferably, the anode foils and the separator material sheets comprise one or more alignment holes 102 so that the anodes and separator sheets can be properly aligned and assembled. The encapsulated assembly may also comprise cut outs for the anode tabs 106 to allow for welding to the other anodes.

The present invention also encompasses the use of more than two pieces of separator material to encapsulate one or more anodes. This can be accomplished by first attaching a plurality of pieces of separator material together and then encapsulating one or more anodes within the separator material.

Preferably, the materials used in the present invention as separator materials will be heat-sealable. A heat-sealable material is one that will create a seal with itself when heat is applied. Heat-sealing can be accomplished via direct contact to the material with a heated instrument, i.e. a hot knife, via a laser to create a seal, or by heat from a source such as an oven, hot air gun, or other similar device. The separator materials utilized in the present invention may also be dye cut to form a self-sealed configuration. Preferably, the materials utilized as separator materials in the present invention will be permeable to ions so as to allow dissolved ions in an electrolyte solution to pass through the materials and contact the surface of the anodes, thereby carrying the current between the anode and cathode. Once the anodes are heat-sealed within the separator material, this material will provide the separation layer required to insulate the anodes from both adjacent flat stacked cathodes, and the metallic surface of the surrounding housing or case used in a stacked capacitor configuration.

Suitable materials for use as separator materials in the present invention include, but are not limited to, polymeric materials and paper. Suitable polymeric materials include without limitation, polypropylene (PP), polyethylene (PE), polypropylene-polyethylene copolymers (e.g. PP/PE/PP), polyimides, polyamide imides, polyether imides, polysulfones, polyether sulfones, polyaryl sulfones, polyether ketones, polyether ether ketones, polyphenylene sulfides and polyarylates. Additional polymeric materials suitable for use in the present invention include those discussed in U.S. Pat. No. 6,527,955, incorporated herein by reference in its entirety. Preferably these polymeric or paper materials will be heat-sealable. In preferred embodiments, the polymeric materials utilized as separator materials in the present invention are polyethylene (e.g. TONEN® 25, available from Tonen Corp., Japan) or polyethylene-polypropylene copolymers (e.g. CELGARD® 2300 (PP/PE/PP) and CELGARD® 4560, available from Celgard LLC, Charlotte, N.C.) as discussed in European Patent Application EP 1 296 389, the disclosure of which is incorporated herein by reference in its entirety.

Aluminum foil is the preferred material for the anodes used in the present invention, because of its ability to produce a sufficient quality oxide layer, its conductive properties, and its wide commercial availability. Other metal foils conventionally utilized in electrolytic capacitors may also be used in the present invention, including titanium, tantalum, magnesium, niobium, zirconium and/or zinc. Preferably, a strip of unetched, high purity (99.99%) aluminum foil with high cubicity, wherein at least 85% of the crystalline aluminum structure is oriented in a normal position (i.e., a (1,0,0) orientation) relative to the surface of the foil, is used. Such foils are well-known in the art and are readily available from commercial sources known to those skilled in the art.

In a preferred embodiment of the present invention, the anode foil may be etched in an aqueous halide based etch solution, typically a hydrochloric acid or sodium chloride solution, according to a conventional etch process; for example, U.S. Pat. No. 5,715,133 to Harrington et al. describes a suitable method of etching foil and is incorporated herein by reference in its entirety. The etch solution preferably consists of about 1.3% by weight sodium chloride, about 3.5% by weight sodium perchlorate, about 0.35% sodium persulfate, and deionized water. The etch solution preferably is heated to a temperature in the range of about 60° C. to about 95° C. The foil is etched at a DC current density of about 0.01 A/cm$^2$ to about 0.30 A/cm$^2$. A charge of about 20 coulombs/cm$^2$ to 100 coulombs/cm$^2$ is passed through the foil during the etching process, which requires an etch time in the range of about 2 minutes to about 12 minutes.

The foil is then removed from the etch solution and rinsed in deionized water. The tunnels formed during the initial etch are then widened, or enlarged, in a secondary etch solution, typically an aqueous based nitrate solution, preferably between about 1% to about 20% aluminum nitrate, more preferably between about 10% to about 14% aluminum nitrate, with less than about 1% free nitric acid. The etch tunnels are widened to an appropriate diameter by methods known to those in the art, such as that disclosed in U.S. Pat. No. 4,518,471 and U.S. Pat. No. 4,525,249, both of which are incorporated herein by reference.

After the etch tunnels have been widened, the foil is again rinsed with deionized water and dried. Finally, a barrier oxide layer is formed onto one or both surfaces of the metal foil by placing the foil into an electrolyte bath and applying a positive voltage to the metal foil and a negative voltage to the electrolyte. The barrier oxide layer provides a high resistance to current passing between the electrolyte and the metal foils in the finished capacitor, also referred to as the leakage current. A high leakage current can result in the poor performance and reliability of an electrolytic capacitor. In particular, a high leakage current results in greater amount of charge leaking out of the capacitor once it has been charged.

The formation process consists of applying a voltage to the foil through an electrolyte such as boric acid and water or other solutions familiar to those skilled in the art, resulting in the formation of an oxide on the surface of the anode foil. The preferred electrolyte for formation is a 100–1000 μS/cm, preferably 500 μS/cm, citric acid concentration. In the case of an aluminum anode foil, the formation process results in the formation of aluminum oxide ($Al_2O_3$) on the surface of the anode foil. The thickness of the oxide deposited or "formed" on the anode foil is proportional to the applied voltage, roughly 10 to 15 Angstroms per applied volt. The etched and formed anode foils are cut, preferably dye-cut, prior to use in the present invention.

The encapsulated anode assemblies of the present invention may be used to create an electrolytic capacitor according to the present invention. Suitably, such an electrolytic capacitor is constructed by stacking a plurality of stacked units consisting of a cathode, one or more encapsulated anode assemblies, and a second cathode. The encapsulated anode assemblies may comprise a plurality of anode foils stacked together to form a high energy density anode element. The anode assemblies are then brought in contact with a cathode, but due to the presence of the encapsulating separator material, the anodes and cathode do not themselves contact. Preferably, an electrolytic capacitor is prepared by stacking a plurality of units consisting of a cathode, an encapsulated anode assembly comprising 2, 3, 4, 5, 6, 7, or 8 anodes encapsulated in separator material, and a second cathode. The encapsulated anode assembly and cathode layers are then grouped together in a parallel connection to produce sufficient capacitance for the intended function. This finished stack is inserted into a case with a geometry closely following the contour of the stack, and designed to minimize the space occupied inside the finished defibrillator. A wound roll configuration may also be used, as would be apparent to those skilled in the relevant art. The present invention also encompasses the use of multiple stacked units comprising repeating units of a cathode, an encapsulated anode assembly, and a second cathode, with neighboring stacked units sharing the same cathode.

By encapsulating the anode assembly in a separator material, the size of the anode may be such that it extends beyond the cathode foils, without the concern of contacting the surrounding housing. Electrically insulating the anodes from the case in this manner allows for maximized surface area of the anodes. Similarly, the case geometry can be made such that it closely follows the contours of the stack without contacting the anodes. Encapsulation of the anodes in a separator material also serves to take the place of conventional spacers between the anodes and adjacent cathode foils.

Figure 7:
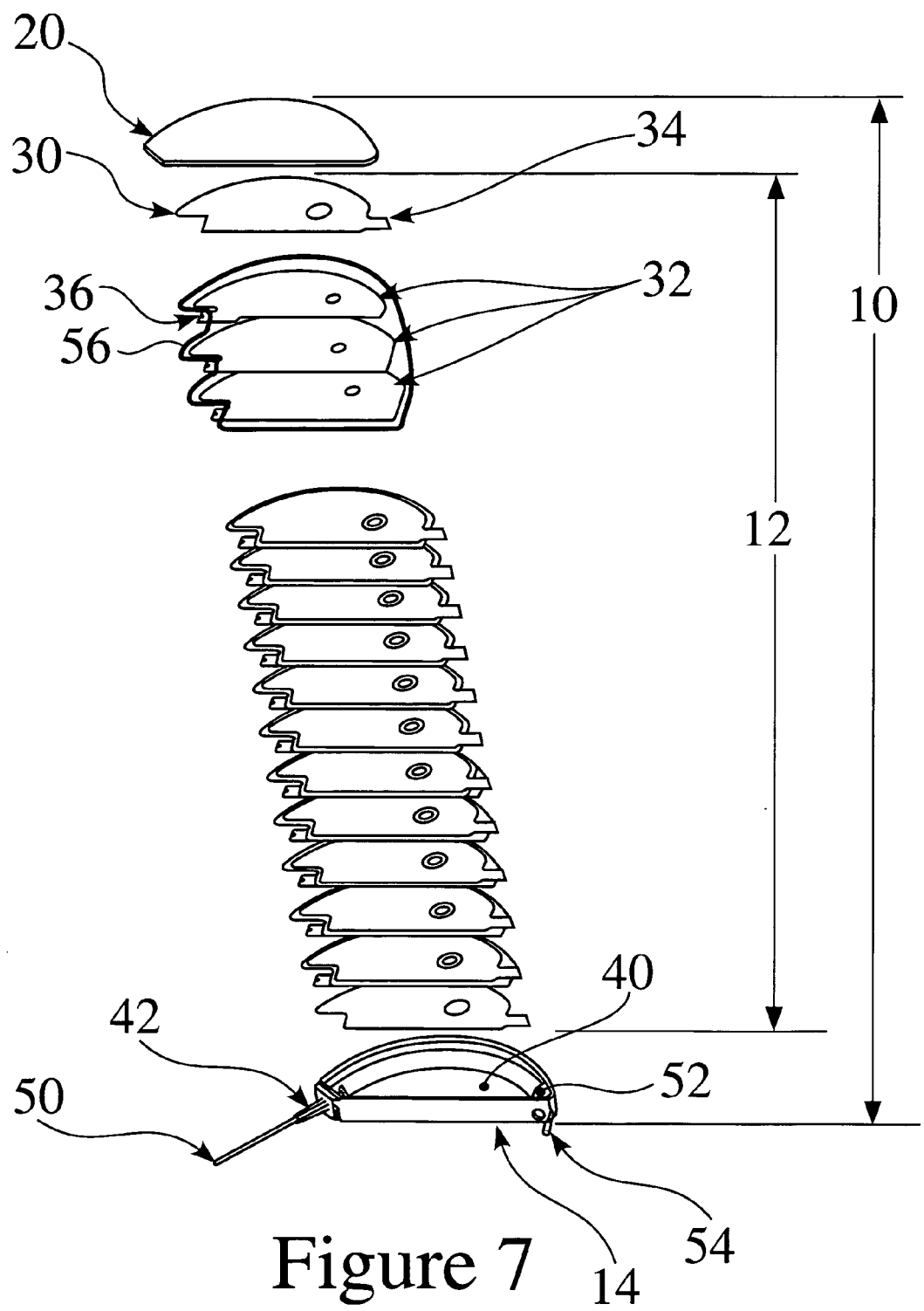
FIG. 7 shows an electrolytic capacitor having an encapsulated anode assembly in a stacked capacitor configuration according to the present invention.

FIG. 7 illustrates a capacitor 10 having a multiple anode flat, stacked capacitor configuration 12 according to the present invention. Flat stack 12 consists of alternating encapsulated anode assemblies 56 and cathodes 30 within a housing 14 enclosed by a lid 20. In a preferred embodiment, the dielectric is provided by an oxide layer on the etched surface of the anodes, while the cathode includes the conductive sheets, the electrolyte-saturated separator material encapsulating the anodes, and the electrolyte that fills the tunnels on the surface of the anodes. Each of the cathodes 30 has a cathode tab 34, all of which are registered with each other to be compressed together for electrical interconnection. Similarly, each of the anodes 32 has an anode tab 36, registered with each other to be compressed together for electrical interconnection. The illustration shows each encapsulated anode assembly having three anodes per assembly for example, although according to the present invention, there may be one or more anodes per assembly, e.g. 2, 3, 4, 5, 6, 7, or 8 anodes per assembly. Additionally, one or both of the end cathodes may be removed, with the housing itself connected to the other cathodes and functioning as a cathode. Preferably, the anode tabs 36 will not be encapsulated in the separator material, thereby allowing all of the anode tabs to be welded together.

In one embodiment of the present invention, the housing 14 is an aluminum container that defines a chamber 40 in which the stack 12 is closely received. The chamber has a depth equal to the thickness of the stack. The housing is provided with a feed through connector 42, which has an electrically conductive lead 50 that extends out of the housing for connection to other circuitry, with an insulative sleeve surrounding the lead and closely received in a bore defined in the wall of the housing to form an environmental seal. The anode tabs 36 are welded together and electrically connected to the terminal of feed through 42. The housing also includes a cathode attachment step 52 in its interior at a position registered with the ends of the cathode tabs 34, so that the tabs may be stacked or welded as a bundle to the step for electrical connection to the housing. A cathode lead 54 is directly electrically connected to the housing for connection to the cathodes. In an embodiment in which the cathode is isolated from the housing, in which the housing is non-conductive, or in which cathodes of different groups are isolated from each other, insulated feed-throughs like those for the anodes may be used. Other arrangements for housing 14 are possible without departing from the scope of the present invention, as would be apparent to one of ordinary skill in the art.

Figure 8:
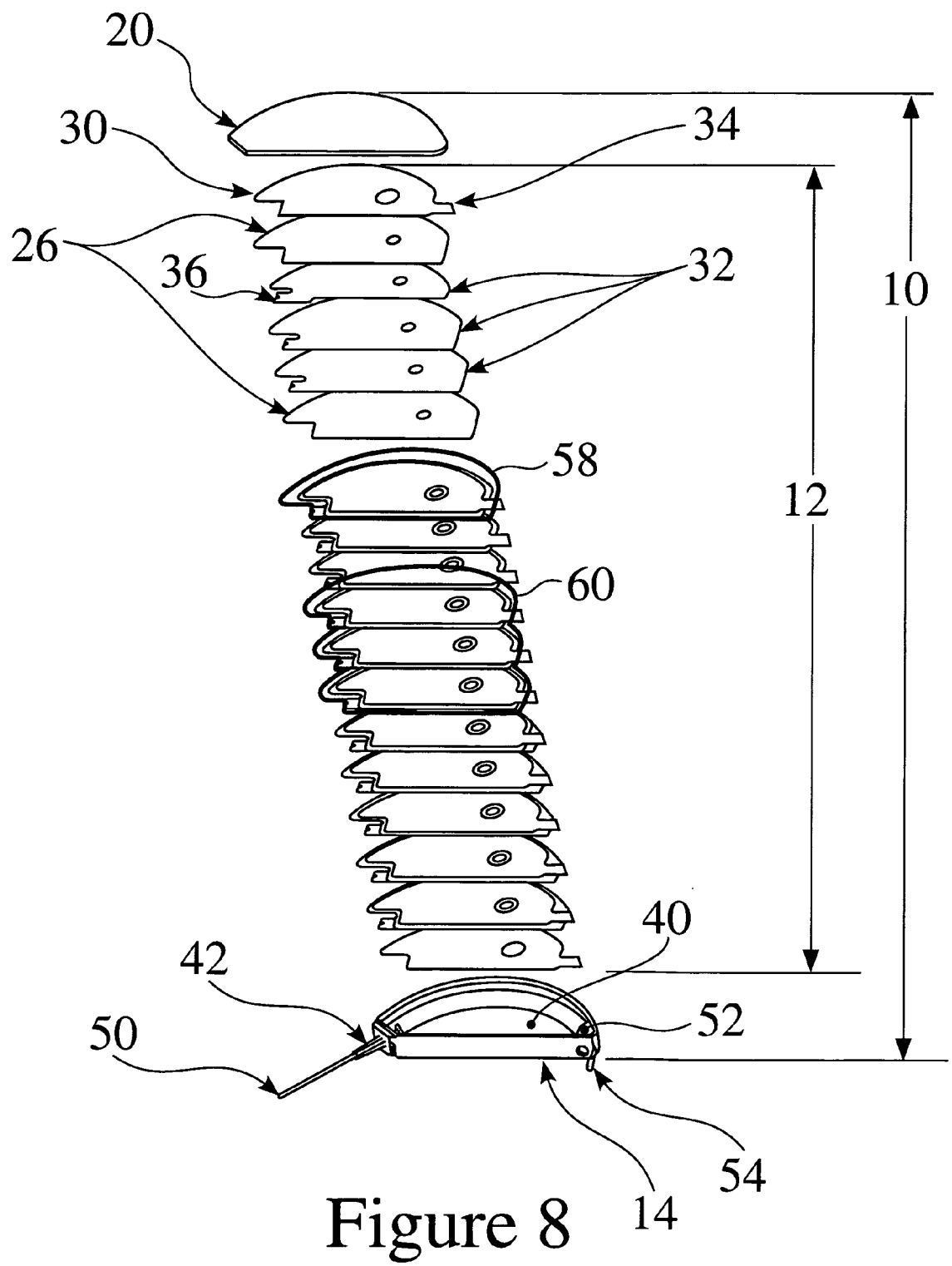
FIG. 8 shows an electrolytic capacitor having a multiple anode flat, stacked encapsulated capacitor configuration according to the present invention.

In another embodiment of the present invention, FIG. 8 illustrates a capacitor 10 having a multiple anode flat, stacked capacitor configuration 12 according to the present invention. In such embodiments, individual stacked capacitor configurations may be enclosed in separator material, or the entire configuration may be enclosed. An individual stacked capacitor configuration, comprising a cathode 30, a spacer 26, one or more anodes 32, and a second cathode 30 may be encapsulated 58, and then placed within a housing 40 enclosed by a lid 20 as discussed above. In additional embodiments, multiple stacked capacitor configurations comprising a plurality of repeating units of a cathode 30, a spacer 26, one or more anodes 32, and a second cathode 30, may be encapsulated 60, and then placed within a housing 40 enclosed by a lid 20 as discussed above. In certain such embodiments, both the anode tabs 36 and the cathode tabs 34 remain outside of the encapsulating separator material so as to allow the electrical components to be welded together. In additional embodiments of the present invention, an individual stacked capacitor configuration of the present invention may comprise a cathode 30, one or more encapsulated anode assemblies 56, and a second cathode 30, which may in turn be encapsulated in separator material prior to placement within a housing 40. Each of the components of the stacked capacitor configuration may comprise one or more alignment holes. A post or other alignment device is placed through the alignment holes to aid in the stacking of the cathodes 30, spacers 26, and anodes 32, so as to maintain alignment of the anode and cathode tabs 34, 36. As discussed throughout, alignment holes allow for the tightest possible tolerances between anodes and cathodes with respect to each other and the case. These features are used so that the proper spacing by the separator is maintained between the anode and the cathode, preventing a catastrophic event such as a direct arc between the aforementioned electrodes. As the case is grounded to the cathode, there must be proper insulation between protruding anodes as well. Using these features to accurately align the anode can allow a maximum amount of area to be utilized, which results in the best optimization of energy density.

In a preferred embodiment of the present invention utilizing stacked capacitor configurations encapsulated 58, 60 according to the present invention, the dielectric is provided by an oxide layer on the etched surface of the anodes, while the cathode includes the conductive sheets, the electrolyte-saturated spacer sheet and encapsulating separator material, and the electrolyte that fills the tunnels on the surface of the anodes. A Kraft paper or porous polymeric spacer may be used between adjacent anodes and cathodes within the stacked capacitor configurations to prevent electrical contact between the flat anode and cathode sheets. Suitable polymeric spacers include, but are not limited to, polypropylene (PP), polyethylene (PE), polypropylene-polyethylene copolymers (PP/PE/PP), polyimides, polyamide imides, polyether imides, polysulfones, polyether sulfones, polyaryl suflones, polyether ketones, polyether ether ketones, polyphenylene sulfides and polyarylates. In preferred embodiments, the polymeric materials utilized as spacers in the present invention are polyethylene (e.g. TONEN® 25) or polyethylene-polypropylene copolymers (e.g. CELGARD® 2300 (PP/PE/PP) and CELGARD® 4560). An electrolytic stacked capacitor configuration according to the encapsulated arrangement 58, 60 of the present invention comprises at least one stacked unit consisting of: a cathode 30, a spacer 26, one or more anodes 32, a spacer 26 and a second cathode 30; with neighboring units sharing the cathode between them. Preferably, the stacked configuration of the present invention comprises a cathode 30, a spacer 26, 2, 3, 4, 5, 6, 7 or 8 anodes 32, a spacer 26, and a second cathode 30. This entire stacked configuration is then encapsulated in separator material prior to placement in the housing. Suitable separator materials include those discussed throughout the present specification. Preferably, the separator material utilized in this aspect of the present invention comprises a heat-sealable polymeric material as discussed throughout the present specification. Preferably, a heat-sealable polymeric material is used, such as polypropylene, polyethylene, or PP/PE/PP copolymers.

In such suitable embodiments, an electrolytic stacked capacitor configuration of the present invention may be completely encapsulated in separator material as in FIG. 8. The separator material utilized in this embodiment may comprise a single continuous piece of separator material, or a plurality of pieces joined together. Preferably, the separator material is heat sealed around the configuration using a hot-knife, laser, or other method as described herein. This results in a capacitor configuration that may then be placed in a metallic housing with the separator material providing insulation between the entire configuration and the metal case. The encapsulated configuration may contain one, or a plurality of stacked capacitor units. If a single stacked capacitor unit is encapsulated, multiple encapsulated units may then be stacked together to create a capacitor assembly.

Figure 9:
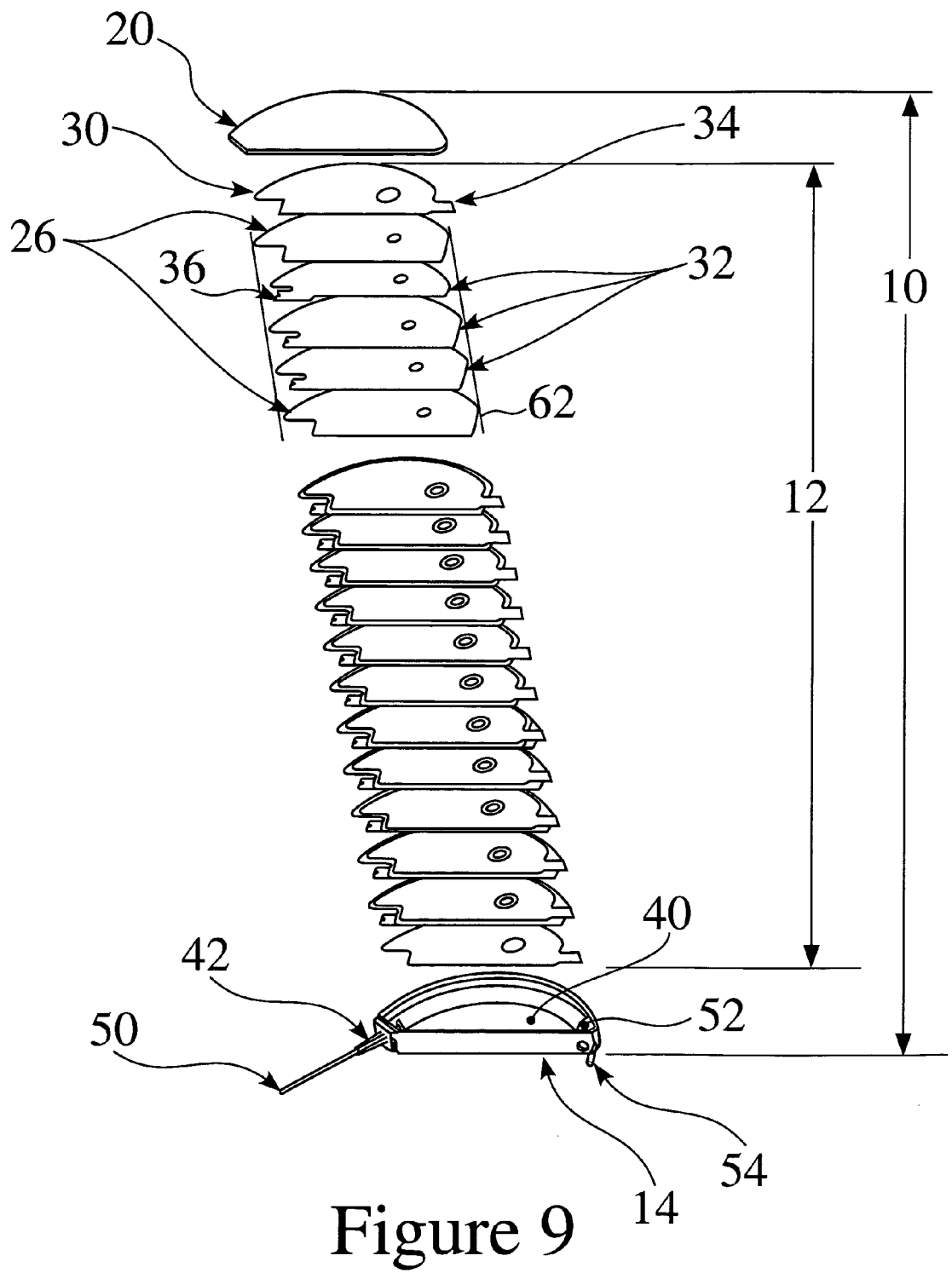
FIG. 9 shows an electrolytic capacitor having a multiple anode flat, stacked enclosed capacitor configuration according to the present invention.

In another suitable embodiment, an electrolytic stacked capacitor configuration of the present invention may be covered only around the edges of the configuration, as in FIG. 9. In such an embodiment, the top and bottom of the stacked configuration may comprise separate separator material sheets or spacers 26. The separator material wrapped around the edges of the configuration 62 serves to insulate the configuration from the metal housing. Preferably, the separator material is heat-sealed so as to create an insulating covering around the outer edge of the configuration. The separator material utilized in such embodiments may be a single continuous piece, or a plurality of pieces attached together. Preferably, a heat-sealable polymeric material is used, such as polypropylene, polyethylene, or PP/PE/PP copolymers.

The present invention also provides processes for preparing such stacked capacitor configurations. Preferably, one or more units consisting of a cathode 30, a spacer 26, one or more anodes 32, a spacer 26 and a second cathode 30 are stacked together. This stacked configuration is then enclosed in separator material. Preferred separator materials, including heat-sealable polymeric materials, are described throughout the present invention. In certain such embodiments, the enclosure step comprises completely encapsulating the stacked capacitor configuration in separator material by covering the entire configuration in a single sheet, or multiple sheets, of separator material, and then heat-sealing the separator material around the entire configuration, thereby encapsulating the configuration. Preferably, the anode and cathode tabs are not encapsulated so as to allow for electrical connection to the other anodes and cathodes. In other embodiments of the present invention, the enclosure step comprises heat-sealing a single sheet, or multiple sheets, of separator material around the edges of the configuration, thereby insulating the edges of the anodes from the metal housing of the capacitor, but not covering the anode and cathode tabs, thereby still allowing them to be electrically connected. Preferably, the enclosure step is performed using a hot-knife or laser to heat seal the separator material.

In all embodiments of the present invention, the pre-assembled capacitor is then vacuum impregnated with an electrically conductive electrolyte, by placing the capacitor in contact with the electrolyte and reducing the pressure to less than 50 cm Hg. The capacitor electrolyte is typically ethylene glycol based with a straight chain dicarboxlyic acid and/or boric acid. Other suitable electrolytes include those known to the ordinarily skilled artisan, including those disclosed in U.S. Pat. No. 5,496,481 to Lui, U.S. Pat. No. 5,507,966 to Liu, U.S. Pat. No. 5,687,057 to Dapo and U.S. Pat. No. 6,587,329 to Feger. The electrolyte is neutralized with ammonia or an amine and a cathode depolarizer, typically a nitro-aromatic compound such as nitrobenzene, nitroacetophenone, or nitroanisole, may be added to the electrolyte to improve the gas evolution behavior of the titanium cathode. Suitably, a cathode depolarizer is added in the range of about 0 to about 5% by weight. Preferably a cathode depolarizer will be added at about 1% by weight. The capacitor is held at this low pressure for 5 to 45 minutes and then pressure is restored, using the pressure to force the electrolyte mixture into the capacitor stack. The capacitor is then removed and placed in an oven at a temperature of about 65° C. to about 90° C. and a maximum oxygen atmospheric concentration of 2% for a period of about 2 hours to about 24 hours. The capacitor is then aged in a normal manner by applying the working voltage to the capacitor, allowing the capacitor to reach this voltage, and then allowing the current to decrease.

Electrolytic capacitors according to the present invention can be incorporated into implantable medical devices, such as implantable cardioverter defibrillators (ICDs), as would be apparent to one skilled in the art, as described in U.S. Pat. No. 5,522,851.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Additionally, all references cited herein, including journal articles or abstracts, published or corresponding U.S. or foreign patent applications, issued U.S. or foreign patents, or any other references, are each entirely incorporated by reference herein, including all data, tables, figures, and text presented in the cited references.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A multiple anode flat, stacked capacitor configuration comprising at least one stacked unit consisting of a cathode, a spacer, one or more anodes, another spacer, and a second cathode, wherein said capacitor configuration is then enclosed in a separator material, and wherein said separator material is permeable to a solvent-based electrolyte.

2. The configuration of claim 1, comprising a plurality of stacked units with neighboring stacked units sharing the cathode between them.

3. The configuration of claim 1, wherein said separator material is selected from paper and polymeric.

4. The configuration of claim 1, wherein said anodes comprise high surface area, formed aluminum foil.

5. The configuration of claim 1, wherein said separator material is selected from the group consisting of polypropylene, polyethylene and polypropylene-polyethylene copolymers.

6. The configuration of claim 1, wherein said separator material prevents said anodes from contacting a metal housing surrounding said configuration.

7. The configuration of claim 1, wherein said separator material completely encapsulates said configuration.

8. The configuration of claim 1, wherein said separator material encloses only the edges of said configuration.

9. The configuration of claim 1, wherein said configuration is impregnated with an ethylene glycol based electrolyte.

10. The configuration of claim 9, wherein said electrolyte comprises ammonium azelate and boric acid in ethylene glycol.

11. The configuration of claim 9, wherein said electrolyte comprises ammonium borate and ammonium phosphate in ethylene glycol.

12. The configuration of claim 9, wherein said electrolyte further comprises a cathode depolarizer.

13. The configuration of claim 1, wherein said spacer is selected from a paper spacer and a polymeric spacer.

14. A process for preparing a multiple anode flat, stacked capacitor configuration comprising:
    (a) stacking one or more units consisting of a cathode, a spacer, one or more anodes, another spacer, and a second cathode; and
    (b) enclosing said configuration in a separator material, wherein said separator material is permeable to a solvent-based electrolyte.

15. The process of claim 14, wherein said separator material is selected from polymeric material and paper.

16. The process of claim 14, wherein said separator material is heat-sealable.

17. The process of claim 14, wherein said separator material is selected from the group consisting of polypropylene, polyethylene and polypropylene-polyethylene copolymers.

18. The process of claim 14, wherein said enclosure step comprises heat-sealing said separator material around said configuration to completely encapsulate said configuration.

19. The process of claim 14, wherein said enclosure step comprises heat-sealing said separator material to cover the edges of said configuration.

20. A multiple anode flat, stacked capacitor configuration comprising at least one stacked unit consisting of a cathode, a spacer, one or more anodes, another spacer, and a second cathode, wherein said capacitor configuration is then enclosed in a separator material and wherein said anodes, cathodes, and spacers comprise alignment holes.

21. The configuration of claim 20, wherein said separator material is permeable to a solvent-based electrolyte.

* * * * *